(12) United States Patent
Kai et al.

(10) Patent No.: US 7,581,752 B2
(45) Date of Patent: Sep. 1, 2009

(54) AIRBAG APPARATUS

(75) Inventors: Takeshi Kai, Saitama (JP); Takashi Nakamura, Saitama (JP); Takashi Aoki, Saitama (JP); Kazuhiro Onda, Saitama (JP); Rei Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 11/700,804

(22) Filed: Jan. 31, 2007

(65) Prior Publication Data
US 2007/0182135 A1 Aug. 9, 2007

(30) Foreign Application Priority Data
Feb. 7, 2006 (JP) ............... 2006-030240

(51) Int. Cl.
*B60R 21/207* (2006.01)
*B60R 21/20* (2006.01)

(52) U.S. Cl. .................. 280/730.2; 280/729

(58) Field of Classification Search .......... 180/271; 280/728.1, 728.2, 730.1, 730.2, 735, 729; 296/68.1

See application file for complete search history.

(56) References Cited

U.S. PATENT DOCUMENTS

| | | | | |
|---|---|---|---|---|
| 6,142,507 A * | 11/2000 | Okuda et al. | ............. | 280/730.2 |
| 7,198,288 B2 * | 4/2007 | Kim et al. | ................ | 280/730.2 |
| 2004/0021304 A1 * | 2/2004 | Tanase et al. | ............... | 280/729 |
| 2004/0056456 A1 * | 3/2004 | Ikeda et al. | .............. | 280/730.2 |
| 2004/0188989 A1 * | 9/2004 | Kanto et al. | ............. | 280/730.2 |
| 2006/0001244 A1 * | 1/2006 | Taguchi et al. | ............. | 280/729 |
| 2006/0022439 A1 * | 2/2006 | Bayley et al. | ............... | 280/729 |
| 2006/0022441 A1 * | 2/2006 | Hayashi et al. | .......... | 280/730.2 |

FOREIGN PATENT DOCUMENTS

JP       2005-313688       11/2005

* cited by examiner

*Primary Examiner*—Ruth Ilan
*Assistant Examiner*—James English
(74) *Attorney, Agent, or Firm*—Carrier, Blackman & Associates, P.C.; William D. Blackman; Joseph P. Carrier

(57) ABSTRACT

An airbag apparatus including an expansion chamber in an arbitrary region of an airbag is disclosed. The expansion chamber has a balancing expansion chamber formed such that an operating force acts in a direction opposite a force acting on the expansion chamber when gas from a gas supplying part is supplied to the expansion chamber.

7 Claims, 5 Drawing Sheets

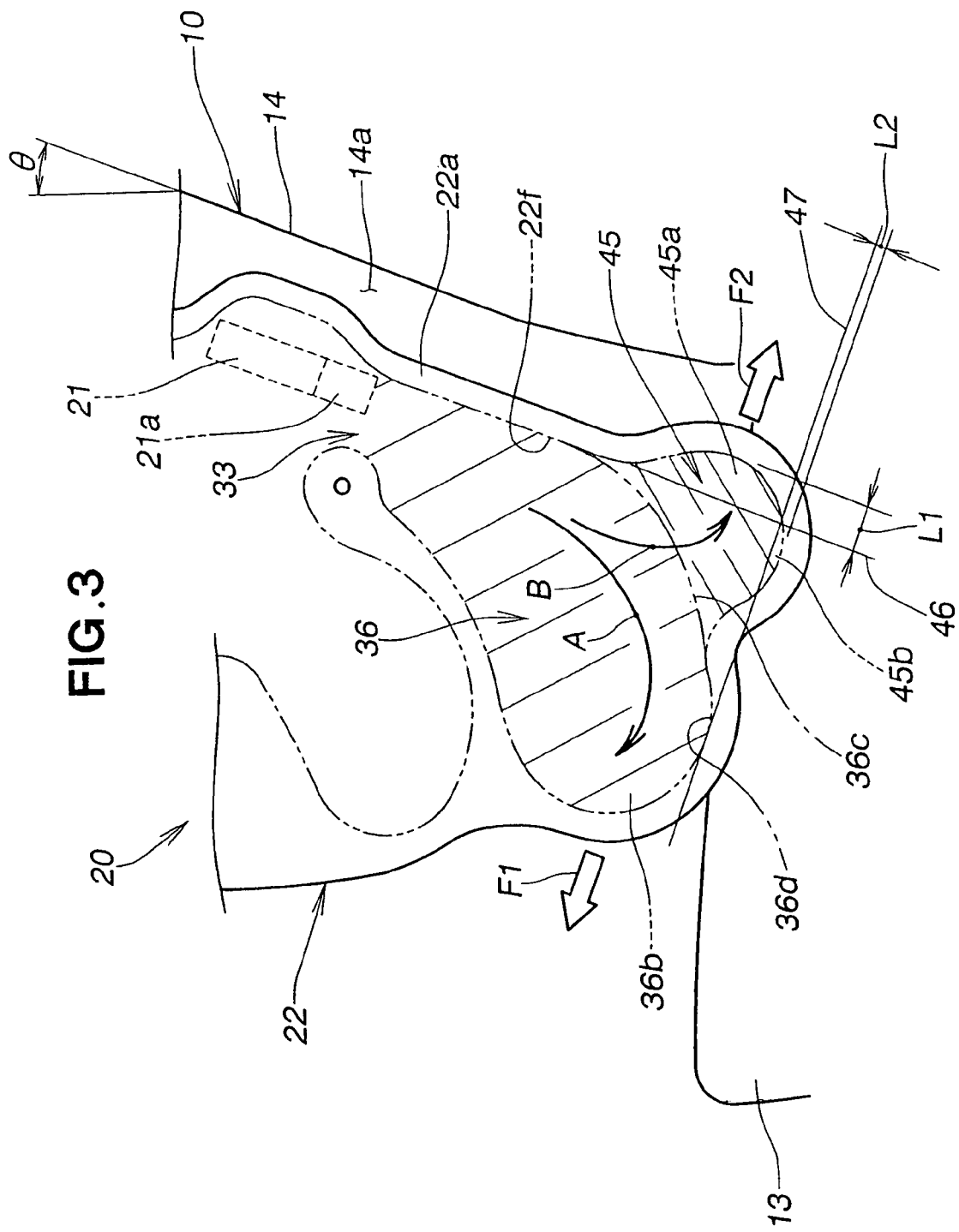

AIRBAG APPARATUS

FIELD OF THE INVENTION

The present invention relates to an airbag apparatus including an expansion chamber in an arbitrary region of an airbag, wherein the expansion chamber is caused to expand by gas supplied to the expansion chamber.

BACKGROUND OF THE INVENTION

Side airbag apparatuses are a type of airbag apparatus in which a folded side airbag is accommodated in a seat back of a vehicle, and which cause the side airbag to expand between a vehicle occupant and a side wall of a vehicle body to protect the vehicle occupant when a side part of the vehicle receives an impact. This type of side airbag apparatus is disclosed in Japanese Patent Laid-Open Publication No. 2005-313688. This side airbag apparatus shall be described below with reference to FIG. 5 hereof.

In a side airbag apparatus 100 shown in FIG. 5, a side airbag 101 is divided by a dividing wall 102, and comprises a chest region protecting chamber (upper expansion chamber) 103 and lumbar region protecting chamber (lower expansion chamber) 104.

The side airbag 101 is caused to expand by gas discharged from an inflator 105, with the gas supplied to the upper expansion chamber 103 and lower expansion chamber 104 as indicated by the arrows. The upper expansion chamber 103 expands toward a chest region 106a of a vehicle occupant 106. The lower expansion chamber 104 expands toward a lumbar region 106b of the vehicle occupant 106. The chest region 106a and lumbar region 106b of the vehicle occupant 106 are supported by the upper expansion chamber 103 and the lower expansion chamber 104, respectively.

When gas is supplied from the inflator 105 to the lower expansion chamber 104, the gas flows toward a front part 104b as indicated by the arrow a along an inner surface of a lower part 104a of the lower expansion chamber 104, and flows upward in the front part 104b, whereby an upward pressing force Fa presses upward on the front part 104b. This upward pressing force Fa causes the lower expansion chamber 104 to move upward. For this reason, the lower expansion chamber 104 does not readily expand in a stable manner, and considerable scope exists for improvement.

SUMMARY OF THE INVENTION

It is therefore an object of the present invention to provide an airbag apparatus whereby an expansion chamber can be caused to expand in a stable manner.

According to a first aspect of the present invention, there is provided an airbag apparatus which comprises an airbag having an expansion chamber in an arbitrary region, and a gas supplying part for supplying gas to the expansion chamber to cause the chamber to expand, wherein the expansion chamber has a balancing expansion chamber.

Therefore, gas is supplied to the balancing expansion chamber, whereby a force acts upon the balancing expansion chamber in a direction different from that of a force generated by the gas supplied to the expansion chamber. The force in the different direction acting upon the balancing expansion chamber allows movement of the expansion chamber to be minimized. Accordingly, advantages are presented in that, when the airbag expands, the expansion chamber can be caused to expand in a stable manner while favorably conforming to the vehicle occupant, and the vehicle occupant can be suitably protected.

Preferably, the arbitrary region where the expansion chamber is disposed is a lower part of the airbag; the gas supplying part is disposed in a side part of the airbag; and the balancing expansion chamber is disposed in a side part of the airbag and a lower part of the expansion chamber.

In other words, the expansion chamber is disposed in the lower part of the airbag, and the gas supplying part is disposed in the side part of the airbag, whereby a distal end of the expansion chamber is disposed on a side part opposite the gas supplying part. Accordingly, the balancing expansion chamber is disposed near the gas supplying part, thereby allowing the balancing expansion chamber to be provided opposite the distal end of the expansion chamber.

Gas supplied from the gas supplying part to the expansion chamber is guided to a bottom part of the expansion chamber and flows upward to the distal end. A force that moves the expansion chamber upward is generated as a result.

Therefore, the balancing expansion chamber is disposed at the bottom part of the expansion chamber, and gas supplied to the balancing expansion chamber flows downward in a direction opposite the flow of the upward-flowing gas supplied to the expansion chamber.

In other words, gas flows in the balancing expansion chamber, whereby the force generated by the gas flowing in the expansion chamber can be efficaciously counterbalanced, upward movement of the expansion chamber can be more suitably minimized, and the expansion chamber can be caused to expand in a more stable manner.

According to a second aspect of the present invention, there is provided an airbag apparatus which comprises an airbag having an expansion chamber in an arbitrary region, and a gas supplying part for providing gas to the expansion chamber to cause the chamber to expand, wherein the expansion chamber has a balancing expansion chamber formed so that a force operates in a direction different from that of a force generated by gas being supplied to the expansion chamber.

Thus, the force enacted upon the balancing expansion chamber by the supplied gas is different from the force operating on the expansion chamber. Therefore, the force operating on the expansion chamber is counterbalanced, and the airbag can be caused to expand in a stable manner without the expansion chamber moving due to the supplying of gas.

Preferably, the balancing expansion chamber is disposed in a side part of the airbag and a lower part of the expansion chamber.

Desirably, the expansion chamber is comprised of an upper expansion chamber and lower expansion chamber that are divided by a dividing or partition wall. When the airbag has expanded, the upper expansion chamber is positioned at a side part of a shoulder region of a vehicle occupant, and the lower expansion chamber is positioned at a side part of a lumbar region of the vehicle occupant. Therefore, the upper parts of the vehicle occupant are protected when the airbag has expanded.

In a preferred form, the balancing expansion chamber is provided on the lower expansion chamber.

BRIEF DESCRIPTION OF THE DRAWINGS

Certain preferred embodiments of the present invention will be described in detail below, by way of example only, with reference to the accompanying drawings, in which:

FIG. 3 is a schematic view illustrating how a force acts on a lower expansion chamber and a balancing expansion chamber as gas is supplied to the airbag apparatus of FIG. 2;

FIGS. 4A and 5B are schematic side elevational views illustrating the mode of deployment of a side airbag of the airbag apparatus of FIG. 1.

DESCRIPTION OF THE PREFERRED EMBODIMENTS

Although the present invention will be described as being applied to a side airbag apparatus, the invention is not limited thereto and may also be applied to other airbag apparatuses used in vehicles.

Figure 1:
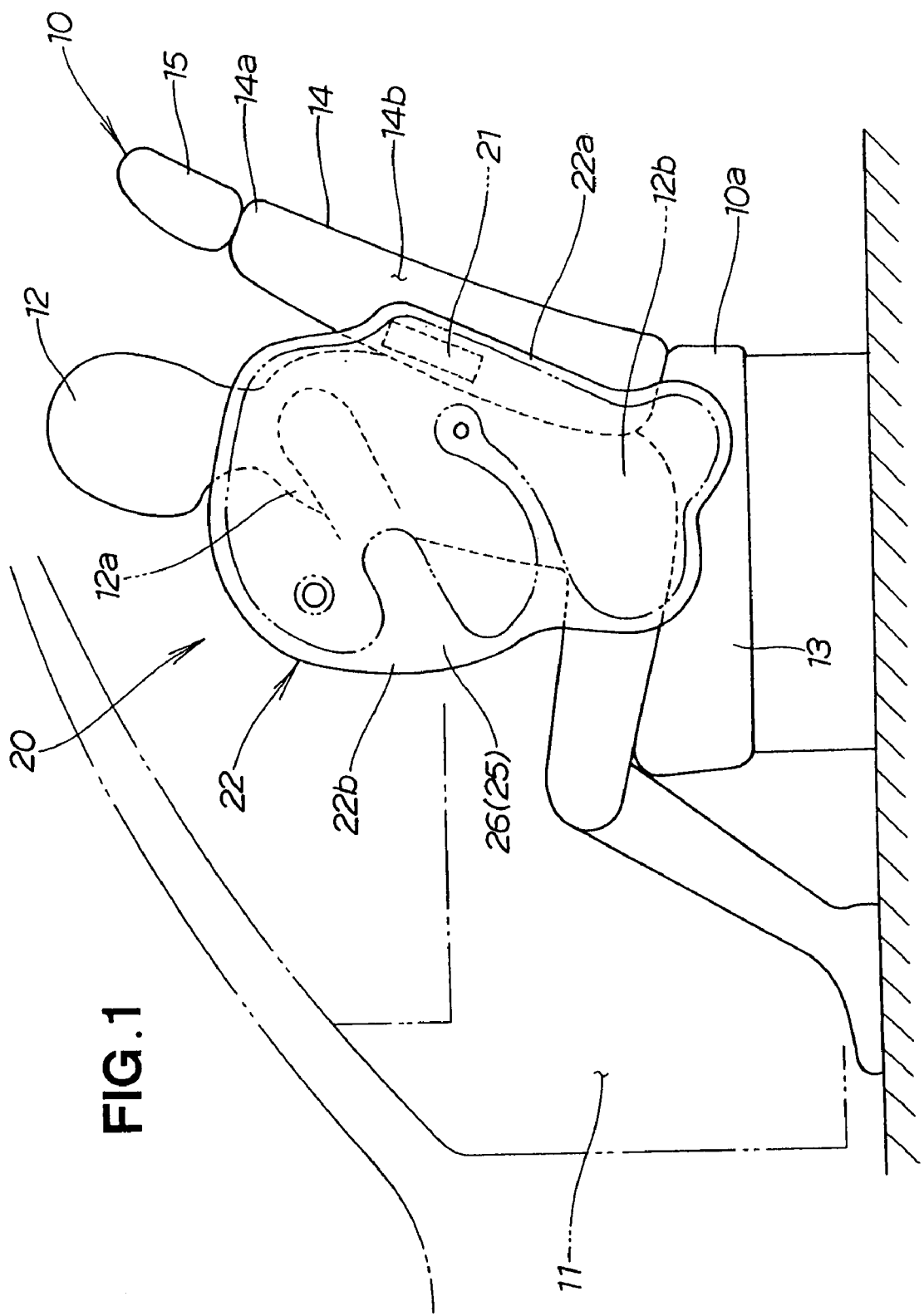
FIG. 1 is a side elevational view showing a vehicle seat to which the airbag apparatus according to the present invention is provided.

A vehicle seat 10 of FIG. 1 illustrates an example that has been disposed at a predetermined distance inside of a left side door 11. The side door 11 constitutes part of a side wall of a vehicle body.

The seat 10 comprises a seat cushion 13 on which a vehicle occupant 12 sits, a seat back 14 provided to a rear part of the seat cushion 13, and a head rest 15 provided to an upper end part 14a of the seat back 14.

A side airbag 22 of the side airbag apparatus 20 of the present invention is accommodated in a folded state in a left side part 14b of the seat back 14. When the side airbag apparatus 20 detects that the side wall of the vehicle body has received an impact, gas is discharged from an inflator 21, and the side airbag 22 is caused to expand by the discharged gas to protect the vehicle occupant.

The side airbag apparatus 20 is composed of the inflator 21 and the side airbag 22. The inflator 21 is mounted in the left side part 14b of the seat back 14 via a mounting bracket (not shown). A rear side part (side part) 22a of the side airbag 22 is mounted on the inflator 21, and the side airbag 22 is provided to the left of the vehicle occupant 12.

Figure 2:
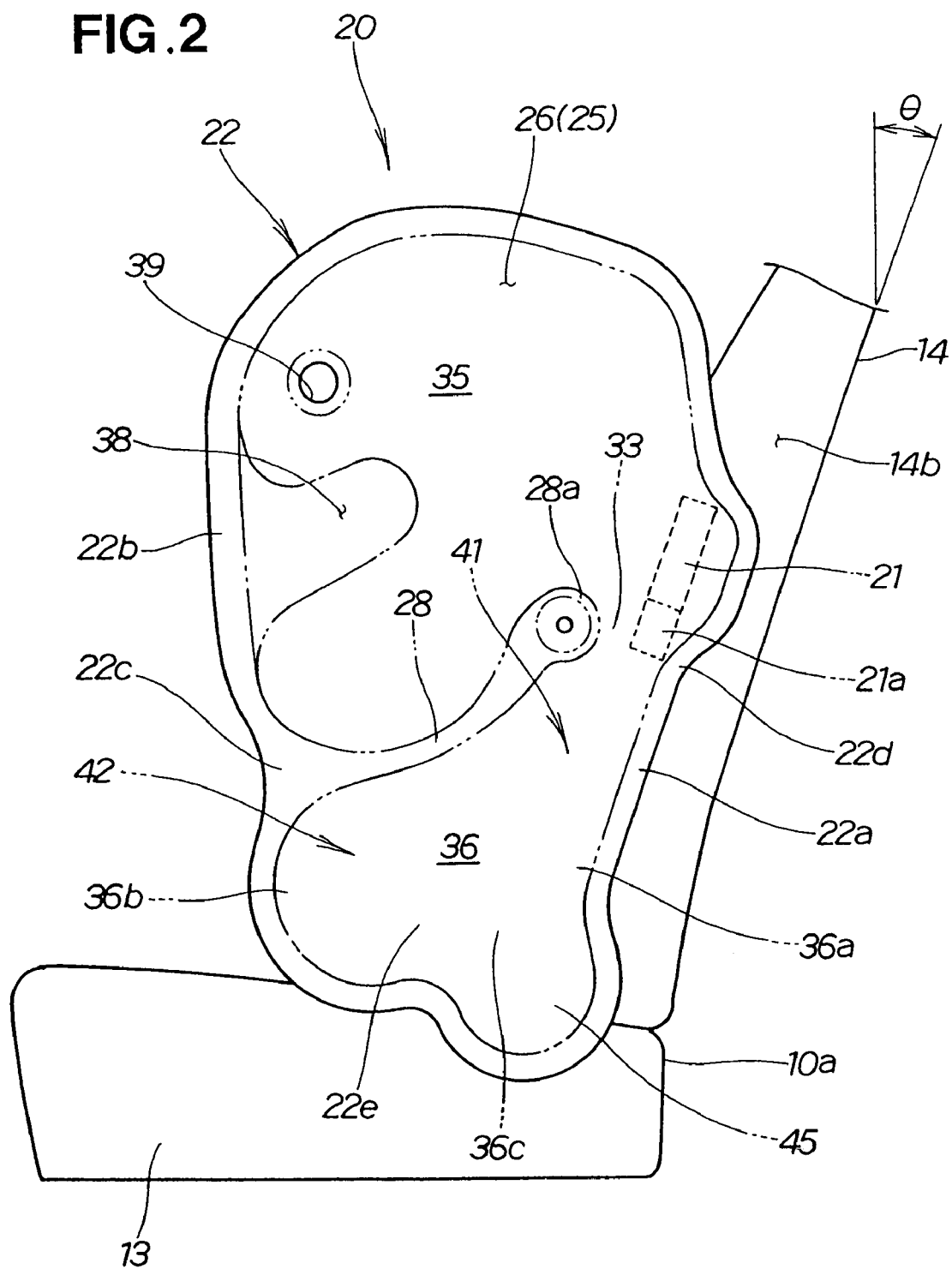
FIG. 2 is a side elevational view showing on an enlarged scale the airbag apparatus of FIG. 1.

In FIG. 2, the inflator 21 is disposed along the left side part 14b of the seat back 14 oriented in a vertical direction substantially parallel with an angle θ (torso angle) at which the seat back 14 is inclined. The inflator 21 comprises a gas supplying part 21a at a lower end part. The gas supplying part 21a is mounted on a rear part 22a of the side airbag 22. The rear part 22a of the side airbag 22 is disposed so as to be substantially parallel to the angle of incline θ of the seat back 14 in a longitudinal direction of the inflator 21.

In the side airbag 22, an inside base cloth 25 that faces the vehicle occupant 12 shown in FIG. 1 and an outside base cloth 26 that faces the side door 11 shown in FIG. 1 are sewn together to form a pouch. The side airbag 22 has the rear part 22a, a front part 22b, and a curved primary dividing wall 28 formed in a rising gradient shape from a lower part 22c of the front part 22b toward the rear part 22a. The curved primary dividing wall 28 is formed by sewing together the inside base cloth 25 and outside base cloth 26, and is made sufficiently strong to remain in place during deployment of the airbag, as shown in the drawings. As shown in the drawings, the curved primary dividing wall 28 is formed so as to are downwardly as it extends from an area of the side airbag 22 proximate a substantially central part 22d of the rear part 22a toward the lower part 22c of the front part 22b of the side airbag 22. An upper end part 28a of the curved primary dividing wall 28 is spaced a predetermined distance away from the substantially central part 22d of the rear part 22a. A gas-introduction port 33 is thereby formed between the upper end part 28a of the curved primary dividing wall 28 and the substantially central part 22d of the rear part 22a, and it will be seen from the drawings that the gas-introduction port 33 provides fluid communication between the upper and lower expansion chambers 35, 36.

The side airbag 22 is divided into an upper expansion chamber 35 on the upper part and a lower expansion chamber (expansion chamber) 36 on the lower part, where the dividing wall 28 acts as a boundary therebetween. The upper expansion chamber 35 and lower expansion chamber 36 are connected to each other via the gas-introduction port 33.

An upper, or secondary dividing wall 38 of the upper expansion chamber 35 protrudes rearwardly from the front part 22b, and the secondary dividing wall 38 effectively separates the upper expansion chamber 35 into two lobes or subchambers. An exhaust hole 39 is formed at a position above the upper dividing wall 38 of the outside base cloth 26. The upper expansion chamber 35 is connected to the exterior via the exhaust hole 39. Gas in the expansion chamber 35 is discharged to the exterior from the exhaust hole 39, whereby a force for restraining the vehicle occupant 12 can be suitably adjusted. The upper expansion chamber 35 expands at a position that corresponds to a chest region 12a of the vehicle occupant 12 shown in FIG. 1.

The lower expansion chamber 36 has the gas-introduction port 33 positioned at an upper part of the lower expansion chamber, a first expanding region 41 extending from the gas-introduction port 33 to an intermediate portion 36a of the lower expansion chamber 36, and a second expanding region 42 extending from the intermediate position 36a of the lower expansion chamber 36 to a front end 36b. The front end 36b of the lower expansion chamber 36 defines a main chamber of the lower expansion chamber 36.

The first expanding region 41 is a region extending in a relatively steeply rising gradient shape along the longitudinal direction of the inflator 21 (i.e., the rear part 22a of the side airbag 22).

The second expanding region 42 is a region extending in a rising gradient that is less extreme than that of the first expanding region 41.

The lower expansion chamber 36 arcs downward from the gas-introduction port 33 to the front end 36b along the dividing wall 28, which has a downwardly arching shape. The lower expansion chamber 36 is connected to the upper expansion chamber 35 via the gas-introduction port 33. The gas-supplying part 21a of the inflator 21 is disposed on the gas-introduction port 33.

The second expanding region 42 is formed on a lower part 22e of the side airbag 22. The second expansion chamber 42 expands at a position that corresponds to a lumbar region 12b (FIG. 1) of the vehicle occupant 12.

The balancing expansion chamber 45 is formed at the rear part 22a of the side airbag 22 and on a lower part 36c of the lower expansion chamber 36, and is connected to the lower expansion chamber 36.

The balancing expansion chamber 45 shall be described in detail below with reference to FIG. 3.

The balancing expansion chamber 45 is formed on the arched lower part 36c of the lower expansion chamber 36, as shown in FIG. 3.

Specifically, the balancing expansion chamber 45 is an expansion chamber whose outer contour is formed into an arch shape, and protrudes downward from the lower part 36c of the lower expansion chamber 36 in the rearward direction. A rear part 45a of the balancing expansion chamber 45 protrudes by an amount L1 to the rear of a vertical line 46, which is the vertical direction of the rear part 22a of the side airbag 22. Therefore, the vertical line 46 is parallel to the rear part 22a of the side airbag 22, and is a straight line coaxial with an inside edge 22f on the rear part of the side airbag 22. Accordingly, the rear part 45a of the balancing expansion chamber 45 protrudes by the amount L1 from the inside edge 22f of the rear of the side airbag 22. The protrusion amount L1 can be suitably selected with consideration given to the side airbag. However, the rear part 45a is preferably made not to protrude in the rearward direction past a rear end part 10a (FIG. 2) of the vehicle seat 10.

A lower part 45b of the balancing expansion chamber 45 protrudes by an amount L2 below a horizontal line 47. The horizontal line 47 is perpendicular to the vertical line 46 and is a straight line extending so as to make contact with an inside edge 36d of the lower part of the lower expansion chamber 36. Accordingly, the lower part 45b of the balancing expansion chamber 45 protrudes downward by the amount L2 from the inside edge 36d of the lower part of the lower expansion chamber 36. The protrusion amount L2 can be suitably selected with consideration given to the side airbag.

Thus, the side airbag 22 comprises the balancing expansion chamber 45 at the rear part 22a of the side airbag 22 and at the lower part 36c of the lower expansion chamber 36. The balancing expansion chamber 45 faces the front end 36b of the lower expansion chamber 36.

Examples of levels at which the protrusion amount L1 and protrusion amount L2 are set shall next be described.

When gas is supplied from the gas supplying part 21a to the lower expansion chamber 36, gas in the lower expansion chamber 36 flows toward the front end 36b as indicated by the arrow A, whereby an upward pressing force F1 having an upward rising gradient is enacted in the forward direction upon the front end 36b of the lower expansion chamber 36.

The protrusion amount L1 and protrusion amount L2 are set so that gas will flow to the balancing expansion chamber 45 as indicated by the arrow B. The gas flow indicated by the arrow B is oriented in a direction opposite that of the gas flow indicated by the arrow A.

The gas in the balancing expansion chamber 45 flows as indicated by the arrow B, whereby a downward pressing force F2 having a downward gradient is enacted rearward upon the balancing expansion chamber 45.

The downward pressing force F2 is a force in a direction different from that of the force (upward pressing force) F1 generated by the gas supplied to the lower expansion chamber 36, as indicated by the arrow A.

The downward pressing force F2 operates in a direction opposite that of the upward pressing force F1, whereby the upward pressing force F1 is efficaciously counterbalanced by the downward pressing force F2, and the lower expansion chamber 36 is prevented from moving upward.

Thus, the balancing expansion chamber 45 is disposed at the rear part 22a of the side airbag 22 and the lower part 36c of the expansion chamber 36, whereby the lower expansion chamber 36 can be caused to expand in a stable manner.

The operation of the side airbag apparatus 20 shall next be described with reference to FIG. 4A and 4B.

Figure 4A:
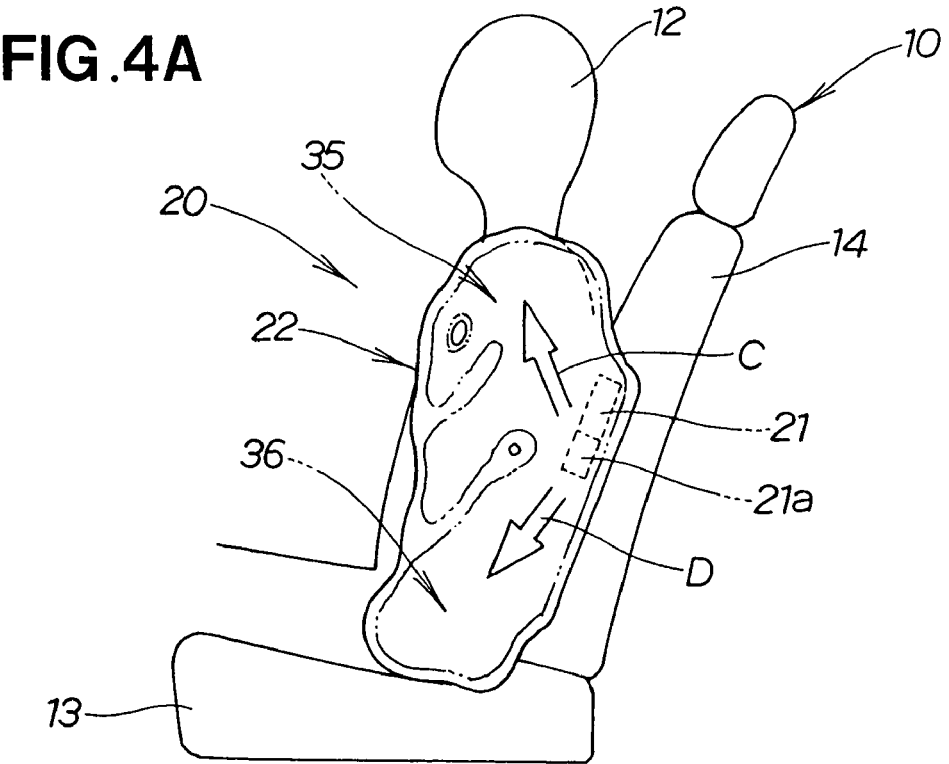

Gas is discharged from the gas supplying part 21a of the inflator 21, as shown in FIG. 4A. The gas discharged from the gas supplying part 21a is directed to the upper expansion chamber 35 as indicated by the arrow C, and to the lower expansion chamber 36 as indicated by the arrow D.

Figure 4B:
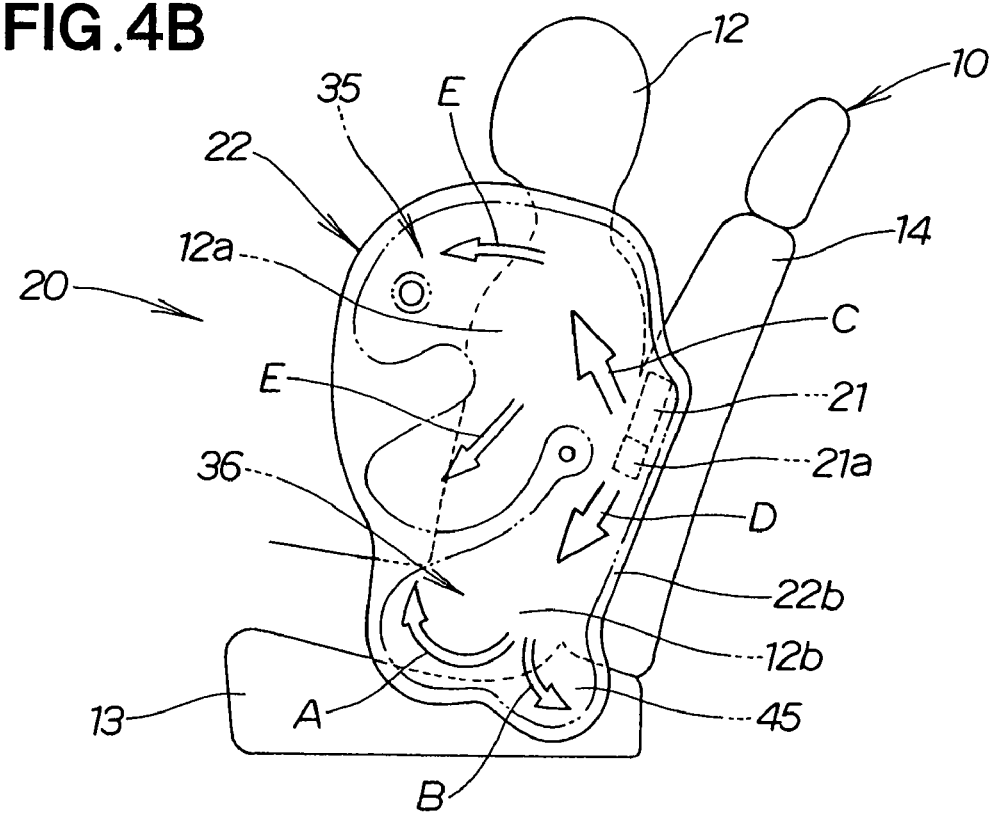
Figure 5:
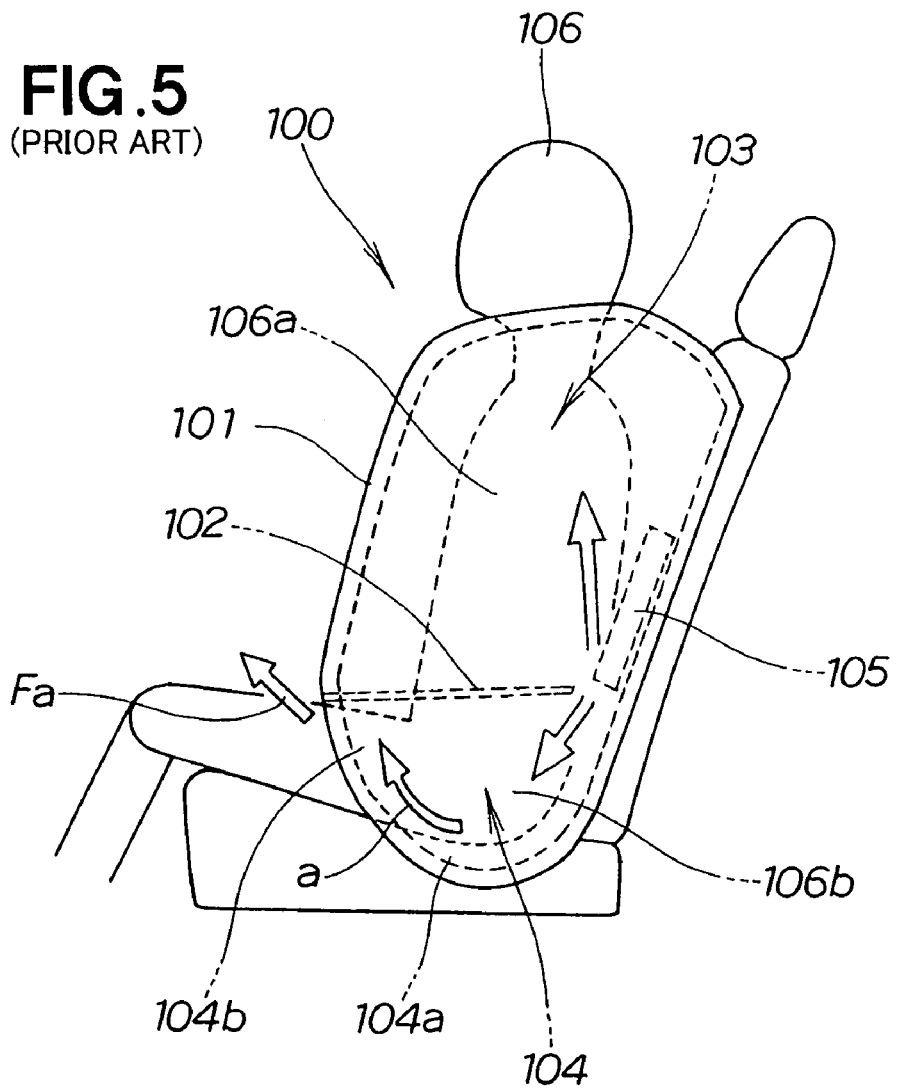
FIG. 5 is a schematic side elevational view showing a conventional side airbag apparatus.

In FIG. 4B, the gas supplied to the upper expansion chamber 35 as indicated by the arrow C flows into the upper expansion chamber 35 as indicated by the arrow E, whereby the upper expansion chamber 35 expands. Accordingly, the upper expansion chamber 35 can be favorably made to face the chest region 12a of the vehicle occupant 12.

At the same time, the gas supplied to the lower expansion chamber 36, as indicated by the arrow D, flows into the lower expansion chamber 36, as indicated by the arrow A, and flows into the balancing expansion chamber 45, as indicated by the arrow B. The gas that flows into the balancing expansion chamber 45 as indicated by the arrow B consequently flows in a direction opposite that of the flow of the gas supplied to the lower expansion chamber 36 as indicated by the arrow A. Accordingly, the upward movement of the lower expansion chamber 36 can be favorably minimized, and the lower expansion chamber 36 can be caused to expand in a stable manner.

Thus, when the side airbag 22 is caused to expand, the upper expansion chamber 35 can be favorably made to face the chest region 12a of the vehicle occupant 12 and the lower expansion chamber 36 can be favorably made to face the lumbar region 12b of the vehicle occupant 12, and the vehicle occupant 12 can be suitably protected.

In the above example, the balancing expansion chamber 45 was situated at the rear part 22a of the side airbag 22 and the lower part 36c of the lower expansion chamber 36. However, the configuration is not limited to the rear part 22a of the side airbag 22; the same effect can be obtained when the balancing expansion chamber 45 is disposed in an arbitrary region of the lower part 36c of the lower expansion chamber 36.

The balancing expansion chamber 45 is disposed in an arbitrary region of the lower part 36c of the lower expansion chamber 36, whereby the downward pressing force acts upon the balancing expanding member 45 when gas is supplied to the balancing expansion chamber 45. The downward force acting on the balancing expansion chamber 45 can thereby minimize upward movement of the lower expansion chamber 36. Accordingly, the lower expansion chamber 36 can be caused to expand in a stable manner when the side airbag 22 expands. Therefore, the lower expansion chamber 36 can be favorably matched to a predetermined region of the body of the vehicle occupant 12, and the vehicle occupant 12 can suitably be protected.

In the above example, the balancing expansion chamber was disposed in the lower expansion chamber 36 provided as an expansion chamber to the lower part 22e of the side airbag 22. However, the present invention is not limited to this configuration; the same effect can be obtained when the balancing expansion chamber is disposed in an upper part, side part, or other arbitrary region of the side airbag 22.

Furthermore, the present invention is not limited to a side airbag 22; the same effect can be obtained when the balancing expansion chamber is disposed in a lower part, upper part, side part, or other arbitrary region of another type of airbag.

In the example, the rear part 22a was used as an example of a side part of the side airbag 22, and the gas-introduction port 33 and inflator 21 were provided to the rear part 22a. However, the configuration is not limited thereto; the gas-introduction port 33 and inflator 21 can also be provided to, e.g., the front part 22b of the side airbag 22.

In addition, in the above example, the side airbag apparatus 20 was caused to expand to the left of the vehicle occupant 12. However, the configuration is not limited thereto; a configuration can be employed in which the side airbag apparatus 20 is caused to expand to the right of the vehicle occupant 12.

Furthermore, in the above example, the balancing expansion chamber 45 was formed in a curved shape. However, the configuration is not limited thereto; the balancing expansion chamber 45 can also be formed into a rectangle or other shape.

Obviously, various minor changes and modifications of the present invention are possible in light of the above teaching. It is therefore to be understood that within the scope of the appended claims the invention may be practiced otherwise than as specifically described.

What is claimed is:

1. An airbag apparatus for attachment to a vehicle seat including a seat cushion for supporting a vehicle occupant thereon, and a seat back operatively attached to the seat cushion, said airbag apparatus comprising:

an airbag having a first expansion chamber provided at a first region thereof, a second expansion chamber provided at a second region thereof, and a primary dividing wall separating the first and second expansion chambers; said airbag having a deployed configuration in which an upper portion thereof overlaps part of the seat back, and a lower portion thereof overlaps part of the seat cushion as seen from a side view thereof; and a gas supplying part for supplying gas to the first and second expansion chambers to cause the expansion chambers to expand;

wherein the second expansion chamber comprises a balancing expansion chamber which is configured and arranged to help stabilize the airbag during expansion thereof;

wherein the primary dividing wall is made sufficiently strong to remain in place during deployment of the airbag; and wherein the second expansion chamber is disposed at a lower part of the airbag, the gas supplying part is disposed on a side part of the airbag, and the balancing expansion chamber is positioned at a side of the airbag and provided at a lower part of the second expansion chamber.

2. An airbag apparatus for attachment to a vehicle seat including a seat cushion for supporting a vehicle occupant thereon, and a seat back operatively attached to the seat cushion, said airbag apparatus comprising:

an airbag having an expansion chamber provided at an arbitrary region thereof, said airbag having a deployed configuration in which an upper portion thereof overlaps part of the seat back, and a lower portion thereof overlaps part of the seat cushion as seen from a side view thereof; and a gas supplying part for providing gas to the expansion chamber to cause the expansion chamber to expand;

wherein the expansion chamber has a balancing expansion chamber for redirecting part of a force of supplied gas, and wherein the balancing expansion chamber is positioned at a side of the airbag and provided at a lower part of the expansion chamber proximate the seat cushion, and is configured to resist upward movement of the airbag during deployment thereof.

3. An airbag apparatus comprising:

an airbag having a plurality of expansion chambers formed therein and separated by at least one dividing wall, with a balancing expansion chamber protruding from at least one of said expansion chambers for further balancing gas flow within said airbag; and a gas supplying part for providing gas to said expansion chambers to cause the expansion chambers to expand during deployment of said airbag;

wherein said at least one dividing wall is made sufficiently strong to remain in place during deployment of said airbag, and is operable to direct gas flow between said expansion chambers in a direction different from a direction of gas supplied to said expansion chambers for favorably controlling expansion of said airbag in a stable manner, and wherein the balancing expansion chamber is provided at a lower part of said airbag proximate a seat cushion of a vehicle seat, and is configured to resist upward movement of said airbag during deployment thereof.

4. An airbag apparatus, comprising: an airbag having a plurality of expansion chambers formed therein and separated by at least one dividing wall, with a balancing expansion chamber protruding from at least one of said expansion chambers for further balancing gas flow within said airbag; and a gas supplying part for providing gas to said expansion chambers to cause the expansion chambers to expand during deployment of said airbag; wherein said at least one dividing wall is made sufficiently strong to remain in place during deployment of said airbag, and is operable to direct gas flow between said expansion chambers in a direction different from a direction of gas supplied to said expansion chambers for favorably controlling expansion of said airbag in a stable manner, wherein said airbag comprises an upper expansion chamber and a lower expansion chamber, and wherein the upper expansion chamber is configured to be positioned at a side part of a shoulder region of a vehicle occupant, and the lower expansion chamber is configured to be positioned at a side part of a lower back region of the vehicle occupant, and wherein the balancing expansion chamber is provided at a lower part of said airbag proximate a seat cushion of a vehicle seat, and is configured to resist upward movement of said airbag during development thereof.

5. The airbag apparatus of claim 3, wherein the balancing expansion chamber is formed on the lower expansion chamber.

6. An airbag apparatus for attachment to a vehicle seat including a seat cushion for supporting a vehicle occupant thereon, and a seat back operatively attached to the seat cushion, said airbag apparatus comprising:

an airbag having a first expansion chamber provided at an upper region thereof, a second expansion chamber provided at a lower region thereof, a primary dividing wall separating the first and second expansion chambers, and a secondary dividing wall extending rearwardly from a front edge portion of said airbag and defining upper and lower portions of the first expansion chamber on opposite sides thereof;

said airbag having a deployed configuration in which an upper portion thereof overlaps part of the seat back, and a lower portion thereof overlaps part of the seat cushion as seen from a side view thereof; and a gas supplying part disposed on a side part of said airbag for supplying gas to the first and second expansion chambers to cause the expansion chambers to expand;

wherein the second expansion chamber comprises a main chamber and a balancing expansion chamber which is connected to the main chamber and which is configured and arranged to help stabilize said airbag during expansion thereof.

7. The airbag apparatus of claim 6, wherein the primary dividing wall is formed with a curved shape and extends from an area of said airbag proximate a substantially central portion of a rear part of said airbag toward a lower portion of a front part of said airbag, and wherein an upper end part of the primary dividing wall is spaced away from a rear edge of said airbag to define a gas-introduction port which provides fluid communication between the first and second expansion chambers.

* * * * *